United States Patent

[11] 3,613,917

| [72] | Inventor | John H. Fowler, Jr.<br>2648 Hillside Lane, Evanston, Ill. 60201 |
|---|---|---|
| [21] | Appl. No. | 874,273 |
| [22] | Filed | Nov. 5, 1969 |
| [45] | Patented | Oct. 19, 1971 |

[54] LIFT DEVICE WITH A PIVOTAL ELEVATOR PLATFORM
9 Claims, 10 Drawing Figs.

| [52] | U.S. Cl. | 214/75 R |
|---|---|---|
| [51] | Int. Cl. | B60p 1/44 |
| [50] | Field of Search | 214/75, 75 T, 701 P |

[56] References Cited
UNITED STATES PATENTS

| 2,530,341 | 11/1950 | Satsky | 214/75 T |
|---|---|---|---|
| 3,368,704 | 2/1968 | Pope | 214/75 T |
| 3,516,559 | 6/1970 | Walter | 214/75 R |

FOREIGN PATENTS

| 497,749 | 9/1954 | Italy | 214/75 |

*Primary Examiner*—Gerald M. Forlenza
*Assistant Examiner*—Raymond B. Johnson
*Attorney*—Dawson, Tilton, Fallon & Lungmus ABSTRACT: A lift device particularly suitable for lifting wheelchairs and the like into a vehicle. The lift device includes a platform which can be used to raise and lower objects between the ground and the floor of the vehicle, and when the lift device is not being used, the platform can be folded compactly into the vehicle. The platform is pivotally supported at the ends of a pair of lift arms, and the other end of each of the lift arms is in turn pivotally secured to a housing slidably mounted on a generally vertical support post. A hydraulic piston is operatively connected to each of the housings for sliding the housings along their respective support posts to raise and lower the platform and the lift device may be folded by pivoting the platform about its connection to the lift arms and by pivoting the lift arms about their connections to the housings.

PATENTED OCT 19 1971 3,613,917

INVENTOR:
JOHN H. FOWLER, JR.
BY
Dawson, Tilton, Fallon & Lungmus
ATT'YS

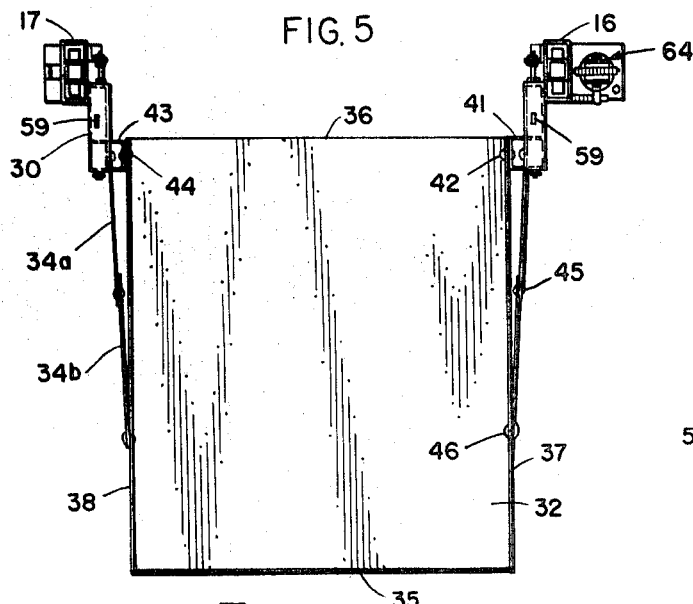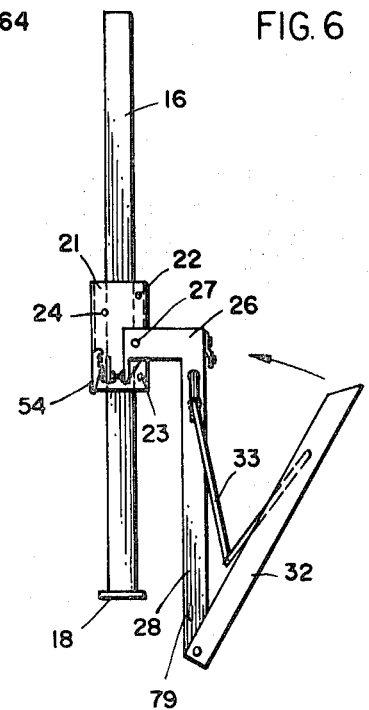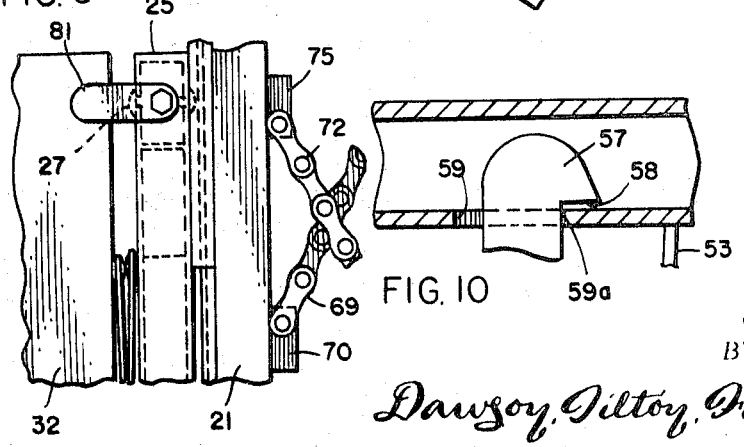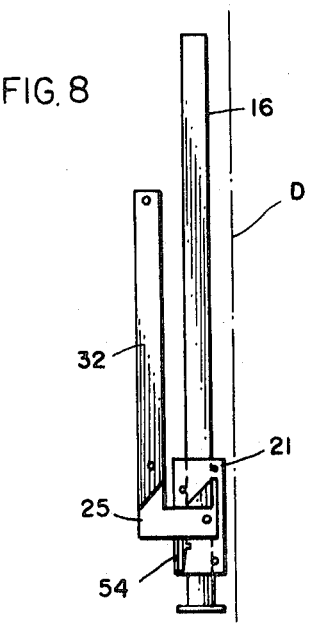

3,613,917

LIFT DEVICE WITH A PIVOTAL ELEVATOR PLATFORM

BACKGROUND

This invention relates to lift devices, and, more particularly, to lift devices particularly suitable for lifting wheelchairs and the like into vehicles.

Invalids and other persons confined to wheelchairs often desire to be as independent as possible and it is important for both their morale and the morale of those who care for them that such invalids not be unduly hampered in their freedom to move from one location to another. For example, many invalids would be far less reluctant to travel by automobile if it were not for the difficulty and discomfort of transferring between the wheelchair and the vehicle. Lift devices for use with vehicles have been provided in the past, but such lift devices have been relatively bulky and have either been disposed externally of the vehicles or have occupied a large amount of space in the interiors of such vehicles. It is clearly preferable to have the lifts completely contained in the vehicles when such vehicles are in motion; however, the large size of the lift mechanisms has often necessitated external location of at least portions of such equipment.

Attempts to reduce the amount of interior space occupied by the lifts have tended to result in devices which impose greater inconvenience and discomfort on the persons using them. Very frequently, an invalid cannot use such a lift device without the assistance of one or two aides.

SUMMARY

The inventive lift device is designed to lift a wheelchair or the like smoothly and easily into a vehicle without any discomfort to the user. After the wheelchair has been lifted into the vehicle, the lift device may be folded and pivoted completely within the vehicle where it will occupy a minimal amount of space.

DESCRIPTION OF THE DRAWING

The invention will be explained in conjunction with an illustrative embodiment shown in the accompanying drawing, in which:

FIG. 5 is a plan sectional view taken along the line 4—4 of FIG. 2;

FIG. 6 is a view similar to FIG. 3 showing the lift device in the process of being folded;

FIG. 7 is a view of the lift device in a subsequent position during the folding operation;

FIG. 8 is a view of the lift device collapsed within the vehicle;

FIG. 9 is an enlarged fragmentary sectional view of a portion of FIG. 2 with the platform in the raised position; and FIG. 10 is an enlarge fragmentary section view showing the support arm being locked in the retracted or collapsed position.

DESCRIPTION OF SPECIFIC EMBODIMENT

Figure 1:
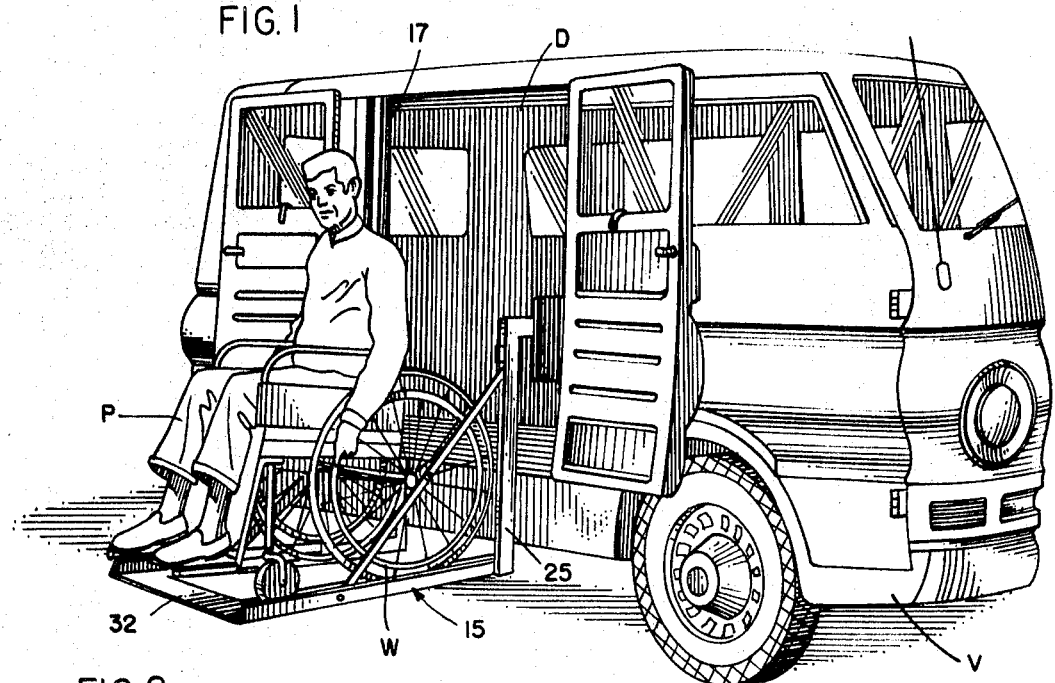
FIG. 1 is a perspective view showing the inventive life device being used to lift a wheelchair into a vehicle.

Referring to FIG. 1, the numeral 15 designates generally a lift device which is seen to be mounted within a doorway D of a familiar van-type vehicle V. A wheelchair W carrying a patient P is supported by the lift device and is shown about to be lifted into the interior of the vehicle.

Figure 2:
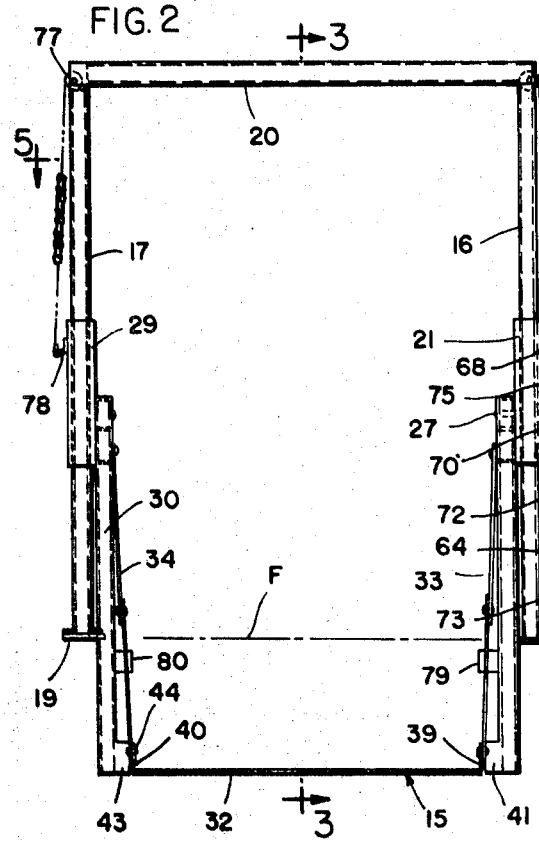
FIG. 2 is a front elevational view of the lift device.
Figures 3, 4:
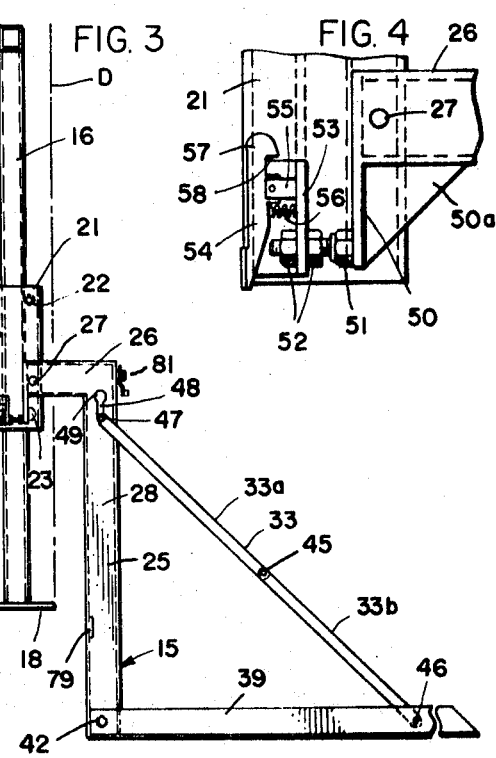
FIG. 3 is a side sectional view of the lift device taken along the line 3—3 of FIG. 2.
FIG. 4 is an enlarged fragmentary view of a portion of FIG. 3.

Referring now to FIGS. 2 and 3, the lift device 15 includes a pair of generally vertically extending support posts 16 and 17 which extend adjacent the opposite sides of the doorway D. The support posts 16 and 17 are advantageously formed of square tubing, and each of the support posts includes a baseplate 18 and 19, respectively, which may be bolted to the floor F of the vehicle. A crosspiece 20, also of square tubing, extends between the upper ends of the support posts adjacent the top of the doorway and is secured to the support posts.

A slide housing or sleeve 21 is slidably carried by the support post 16 for sliding movement therealong and is generally rectangular in transverse cross section. As can be seen best in FIG. 3, the housing 21 is positioned on the support post 16 by a pair of upper and lower rollers 22 and 23, respectively, which engage the outer side of the support posts, i.e., the side facing toward the outside of the vehicle, and a roller 24 which engages the inner side of the support post. A generally L-shaped lift arm 25 includes a relatively short attaching portion 26 which is pivotally secured to the housing 21 by means of pin 27 (see also FIG. 9) and an elongated main portion 28 which extends generally vertically in FIGS. 1–3.

Similarly, a slide housing 29 is slidably mounted on the support post 17 and pivotally carries a generally L-shaped lift arm 30.

A generally rectangular platform 32 is pivotally secured to the ends of the lift arms 25 and 30 and is held in the open position illustrated in FIGS. 1–5 by support straps 33 and 34 which extend, respectively, from lift arms 25 and 30. The platform 32 includes front and back edges 35 and 36, respectively, and opposite side edges 37 and 38 (FIG. 5). A pair of sidewalls 39 and 40 extend upwardly from the side edges 37 and 38. As can be seen best in FIGS. 2 and 5, a generally U-shaped lug or bracket 41 extends outwardly from one side of the lift arm 25 adjacent the lower end thereof, and pin 42 pivotally connects the sidewall 39 of the platform to the lug 41. Similarly, the lower end of lift arm 30 includes a U-shaped lug 43 which is pivotally secured to the sidewall 40 by pin 44.

The support strap 33 is formed of two pieces 33a and 33b which are pivotally connected by pin 45, and the lower end of strap 33b is pivotally connected to the sidewall 39 of the platform adjacent the forward end thereof by pin 46. The upper end of the strap 33a carries a pin 47 which rides in a vertically extending slot 48 provided in the lift arm 25 and which may pivot therein. The upper end of the slot 48 terminates in an enlarged opening 49 through which the head of the pin 47 may be withdrawn if desired. The other strap 34 also is formed of two pivotally connected straps 34a and 34b which are pivotally connected, respectively, to lift arm 30 and the sidewall 40 of the platform.

Referring to FIG. 4, a stop plate 50 extends from the inner end of the attaching portion 26 of the lift arm 25 generally parallel to the elongated portion 28 of the lift arm. The stop plate 50 is reinforced by brace 50a and bears against a bolt 51 which is adjustably secured by means of nuts 52 to a plate 53 which extends from the slide housing 21. When the platform is in the open position illustrated in FIGS. 1–5, the stop plate 50 bears against the bolt 51 and maintains the platform in a generally horizontal condition.

A latch 54 is pivotally mounted on the plate 53 by means of lug 55 and is spring biased against counterclockwise rotation as viewed in FIG. 4 by compression spring 56. The latch 54 includes an arcuately shaped head portion 57 which terminates in an inwardly extending shoulder 58. The latch 54 is adapted to be received by slot 59 in the attaching portion 26 of the lift arm as will be described more fully hereinafter. The slot 59 is spaced outwardly from the pivot pin 27 approximately the same distance as the latch 54 is spaced inwardly from the pivot pin.

It will be understood that the slide housing 29 carried by the opposite support post 17 carries a similar stop means for engagement with the lift arm 30 to hold the platform in the opened position and a latch means similar to latch 54.

The means for raising and lowering the support arms and platform can be seen best in FIG. 2. A hydraulic cylinder and piston assembly 64 extends upwardly adjacent the support post 16 and is also supported by the baseplate 18. A hydraulic piston 65 extends upwardly from the cylinder 66 and terminates in a bifurcated bracket 67 which rotatably carries a roller 68. A first cable means represented schematically by the line 69 passes over the roller 68 and has one end thereof secured to the lug 70 (FIG. 10) on the slide housing 21 and the other end secured to the lug 71 on the cylinder 66 adjacent the base thereof. If desired, the lower end of the cable 69 may be anchored to the baseplate 18 or to some other fixed location. A second cable means represented schematically by the line 72 passes over a roller 73 rotatably mounted adjacent the base of the cylinder 66 by bracket 74. One end of the cable means 72 is secured to lug 75 on the slide housing 21, and the cable thereafter extends downwardly around the roller 73 and then upwardly to a roller 76 rotatably mounted on one end of the upper box channel 20. The cable 72 extends through the hollow box channel 20 over a roller 77 rotatably mounted in the other end of channel 20 and thereafter extends downwardly adjacent the support post 17 where it is secured to lug 78 attached to the slide housing 29. The lug 75 is positioned forwardly or outwardly of the lug 70 as viewed in FIGS. 2 and 10, so that the two cable means will not interfere with each other. In the particular embodiment illustrated the cable means 69 and 72 are conventional link chains, portions of which are illustrated. It will be understood that other cable means may also be used.

OPERATION

In FIGS. 2 and 3 the platform 32 is illustrated in a lowered position below the floor F of the vehicle and generally level with the ground. In this position, the occupant of the wheelchair can readily wheel himself onto the platform as illustrated in FIG. 1. Thereafter, either the wheelchair occupant or an aide may operate the hydraulic controls associated with the hydraulic cylinder and piston assembly to raise the piston. Referring to FIG. 2, as the piston 65 is raised, the end of the cable means 69 attached to the lug 70 is pulled upwardly, thereby raising the slide housing 21 and lift arm 25. As the slide housing 21 moves upwardly, the lug 75 pulls the cable 72 about the rollers 73, 76, and 77 and causes the slide housing 29 to move upwardly substantially simultaneously with the slide housing 21. A substantially uniform lifting force is therefore applied to both sides of the platform 32.

When the platform 32 reaches the level of the floor F, upward movement of the piston 65 is stopped, and the occupant may wheel the wheelchair into the interior of the van. It will be appreciated that the patient can thereby be lifted into the vehicle without any discomfort or exertion on his part.

After the wheelchair has been moved into the van, the platform 32 can be pivoted upwardly about its pivot connections to the lift arms 25 and 30 as illustrated in FIG. 6. The individual sections of the support straps 33 and 34 will pivot about their connections to each other and to the platform and support arm to permit the platform to become generally vertically aligned with the lift arms. If so desired, abutments or stops 79 and 80 (FIG. 2) may be provided on each of the lift arms to prevent the platform from rotating past an aligned position with the support arms. A latch 81 (FIG. 3) rotatably secured to the upper end of each of the lift arms 25 and 30 may then be rotated to secure the platform against downward rotation as illustrated in FIG. 9.

The lift arms and platform may then be rotated upwardly about the pivot connections between the lift arms and the slide housings in a counterclockwise direction as viewed in FIG. 7 until the attaching portion of each lift arm engages the upper edge of the associated plate 53 (FIG. 4) carried by each of the slide housing. Referring to FIG. 10, as the slot 59 provided in the attaching portion of each of the lift arms is rotated downwardly toward the latch 54, the edge 59a of the slot engages the arcuate head 57 of the latch and pivots the latch against the bias of the spring 56 until the wall of the box channel is lowered below the shoulder 58. Thereafter, the spring 56 moves the shoulder 58 into latching position above the edge 59a of the slot.

Referring to FIGS. 3 and 8, the support posts 16 and 17 and the slide housings 21 and 29 carried thereon are positioned within the interior of the vehicle inwardly of the doorway D. When the platform and lift arms are in their collapsed or folded position illustrated in FIG. 8, these portions of the lift device are also positioned entirely within the interior of the vehicle. Further, the platform and support arms extend generally vertically adjacent the doorway of the vehicle and occupy a minimal amount of the interior space of the vehicle. The latches 81 and 54 securely hold the platform and lift arms, respectively, in the collapsed position, and prevent undesired movement of the lift device while the vehicle is moving.

If the upper side of the doorway of the vehicle does not permit rotation of the lift arms into the vertical position illustrated in FIG. 8, the hydraulic power means can be operated to lower the piston 65, thereby lowering the slide housings 21 and 29 to permit the end of the lift arms and platform to clear the upper side of the doorway. The slide housing 21 is illustrated in a lowered portion in FIG. 7 to permit rotation of the lift arms into the interior of the vehicle.

When it is desired to remove the wheelchair from the vehicle, substantially the reverse operation is employed. The latches 54 are pivoted counterclockwise to permit the lift arms to be rotated downwardly and out of the vehicle. The latches 81 are thereafter moved to release the platform for downward movement into the open position illustrated in FIG. 3. If necessary, the hydraulic cylinder and piston may be operated to position the platform level with the vehicle floor, and after the wheelchair is positioned on the platform, the piston may be lowered to permit the slide housings 21 and 29 to lower the platform to the ground.

Although the inventive lift device has been described specifically for use in lifting wheelchairs into vehicles, it will be understood that the use of the lift device is not so limited. The device may be used for lifting a variety of objects and need not be mounted in a vehicle.

While in the foregoing specification, a detailed description of a specific embodiment of my invention was set forth for the purpose of illustration, it is to be understood that many of the details herein given may be varied considerably by those skilled in the art without departing from the spirit and scope of my invention.

I claim:

1. A lift device comprising a pair of generally vertically extending spaced-apart support posts, slide means slidably carried by each of said support posts, power means for sliding said slide means along the support posts, a pair of elongated lift arms, each of said lift arms having one end thereof pivotally secured to one of said slide means and movable between a lowered position in which said lift extends generally downward from said slide means and a raised position in which said arms are substantially parallel to said posts, a generally rectangular platform carried between said lift arms and pivotally secured thereto adjacent the other ends of the lift arms, said platform being pivotable between a lowered position in which said platform is generally horizontal and a raised position in which the platform is generally parallel with the lift arms, and strap means extending from each of said lift arms to said platform for supporting the platform in the lowered position.

2. The lift device of claim 1 including latch means on at least one of said lift arms for releasably locking the platform in the raised position and latch means on at least one of said slide means for releasably latching the lift arms in the raised position.

3. The lift device of claim 1 in which said slide means includes a housing slidably carried by each of the support posts, said power means including a cylinder and piston assembly for raising and lowering at least one of the slide housings along the associated support post.

4. The lift device of claim 3 in which said power means includes cable means extending between said one slide housing and the other slide housing for raising and lowering the other slide housing as said one slide housing is raised and lowered by said cylinder and piston assembly.

5. A lift device adapted for lifting objects into a vehicle comprising a pair of generally vertically extending spaced-apart support posts adapted to be mounted on the vehicle, a slide housing slidably carried by each of said support posts for generally vertical movement therealong, a pair of elongated lift arms, each of said lift arms having one end thereof pivotally secured to one of said slide housings and movable between a lowered position in which the lift arm extends generally vertically downwardly from the slide housing and a raised position in which the lift arms extends generally vertically upwardly from the sliding housing, a generally rectangular platform carried between said lift arms and being pivotally secured thereto adjacent the other ends of the lift arms, said platform being pivotable between a lowered position in which the platform is generally perpendicular to the lift arms and a raised position in which the platform is generally parallel with the lift arms, strap means extending between each of the lift arms and the platform for supporting the platform in the lowered position, and power lift means operatively connected to at least one of said slide housings for raising and lowering said one slide housing whereby the platform may be raised and lowered.

6. The lift device of claim 5 including cable means extending between said one slide housing and the other slide housing for raising and lowering the other slide housing as the one slide housing is raised and lowered by the power lift means.

7. The lift device of claim 5 in which each of said lift arms is generally L shaped and includes a relatively short attaching portion pivotally connected to the associated slide housing and an elongated portion extending generally perpendicular to the attaching portion whereby said support posts may be mounted within the interior of the vehicle, the elongated portions of the lift arms extending downwardly outside of the vehicle when in the lowered position and extending upwardly within the vehicle when in the raised position.

8. The lift device of claim 7 including latch means on one of said slide housings, said latch means being releasably engagable with the attaching portion of one of the lift arms when the lift arm is in the raised position.

9. The lift device of claim 5 in which said power lift means includes a generally vertically extending cylinder and piston assembly adjacent one of the support posts, first roller means carried by the upper end of the piston, first cable means having one end connected to the slide housing on said one support post, said first cable means extending over said roller means and having the other end thereof secured against movement, second cable means having one end thereof connected to the slide housing associated with said one support post, said second cable means extending downwardly from the slide housing and extending about second roller means rotatably mounted on the lift device, said second cable means extending upwardly from said second roller means and passing over third roller means rotatably carried adjacent the upper end of said one support post and fourth roller means rotatably carried adjacent the upper end of the other support post, said second cable means extending downwardly from said fourth roller means and having the other end thereof connected to the other slide housing whereby said first cable means pulls said first slide housing upwardly as said piston moves upwardly and said second cable means pulls said second slide housing upwardly as the first slide housing moves upwardly.

UNITED STATES PATENT OFFICE
CERTIFICATE OF CORRECTION

Patent No. 3,613,917      Dated October 19, 1971

Inventor(s) John H. Fowler, Jr.

It is certified that error appears in the above-identified patent and that said Letters Patent are hereby corrected as shown below:

Claim 1, line 58, "said" should read -- the --.

Claim 5, line 13, "sliding housing" should read -- slide housing --.

Signed and sealed this 9th day of May 1972.

(SEAL)
Attest:

EDWARD M. FLETCHER, JR.
Attesting Officer

ROBERT GOTTSCHALK
Commissioner of Patents